United States Patent [19]
Huttle

[11] Patent Number: 6,023,752
[45] Date of Patent: Feb. 8, 2000

[54] DIGITAL DATA APPARATUS FOR TRANSFERRING DATA BETWEEN NTDS AND BUS TOPOLOGY DATA BUSES

[75] Inventor: William M. Huttle, Waldorf, Md.

[73] Assignee: The United States of America as represented by the Secretary of the Navy, Washington, D.C.

[21] Appl. No.: 08/977,569

[22] Filed: Nov. 25, 1997

[51] Int. Cl.[7] .................................................. G06F 13/14
[52] U.S. Cl. ................................. 712/1; 712/8; 712/27; 712/32; 712/43; 712/200; 712/229; 710/23; 710/24; 710/36; 710/52
[58] Field of Search .............................. 712/1, 6, 32, 33, 712/43, 25, 27, 8, 200, 229; 710/23, 24, 36, 52

[56] References Cited

U.S. PATENT DOCUMENTS

| | | |
|---|---|---|
| 5,129,062 | 7/1992 | Gygi et al. ............................. 395/250 |
| 5,218,690 | 6/1993 | Boioli et al. ............................. 395/500 |
| 5,321,819 | 6/1994 | Szczepanek ............................. 395/325 |
| 5,388,210 | 2/1995 | Clayton et al. .......................... 395/200 |
| 5,414,814 | 5/1995 | McKim .................................... 395/275 |
| 5,428,763 | 6/1995 | Lawler .................................... 395/500 |
| 5,455,926 | 10/1995 | Keele et al. ............................ 395/404 |
| 5,795,156 | 8/1998 | Redford et al. ......................... 434/118 |

Primary Examiner—Larry D. Donaghue
Assistant Examiner—Dzung Nguyen
Attorney, Agent, or Firm—James B. Bechtel, Esq.; John P. McMahon, Esq.

[57] ABSTRACT

A program driver means is disclosed that allows for the exchange of information between a NTDS device and a device having a bus topology, especially a VMEbus. The program driver utilizes chain commands which are fully programmable at the user level. The processor itself is programmed at the register level to assure the fastest data rate possible (32 bit access) across the VMEbus. The processor driver is invisible to the user.

14 Claims, 2 Drawing Sheets

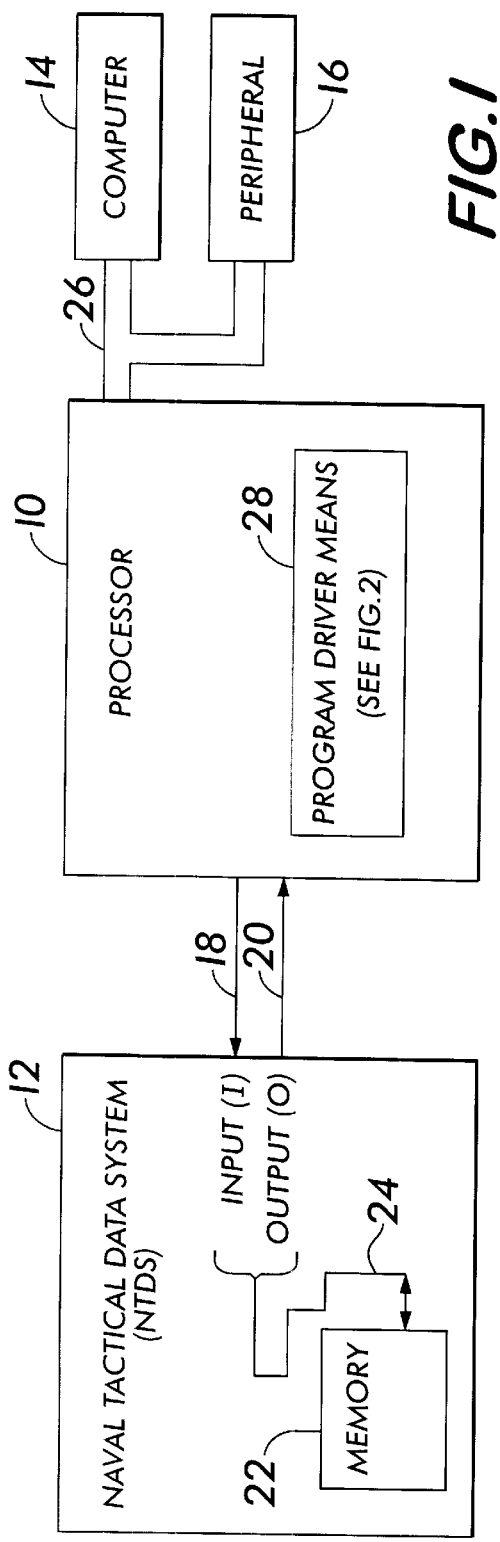

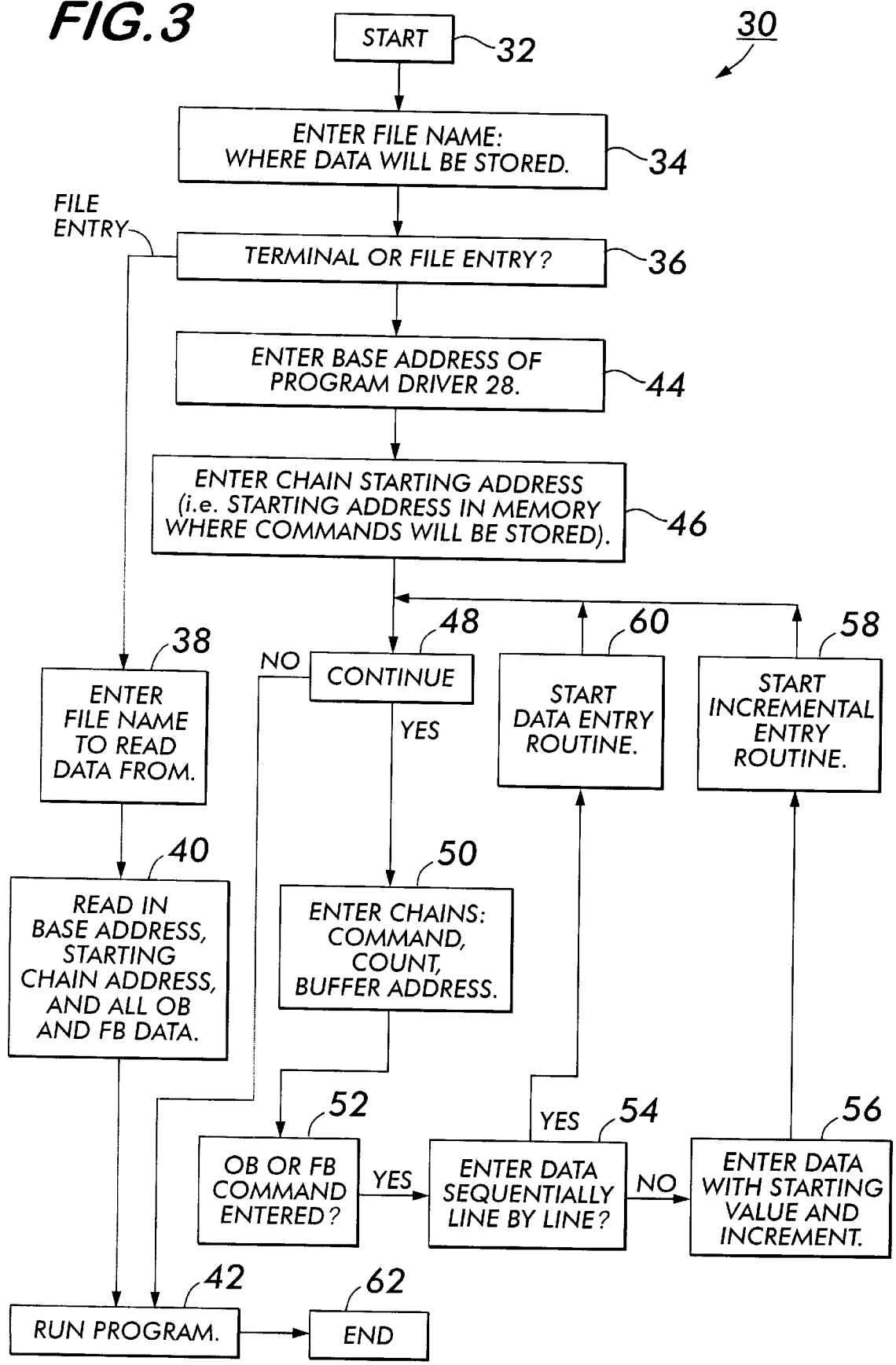

ic data apparatus for transferring data between ntds and bus topology data buses

FIELD OF THE INVENTION

The present invention is related to a program driver that allows for the exchange of information between an NTDS device and a device having a Versa Module Eurocard Bus (VMEbus). The invention reduces development time by allowing users to quickly develop programs for the ANTARES-Visicom VMEbus Bused NTDS card. The program driver is specific to the OS-9 operating system, but can be applied to UNIX based systems.

BACKGROUND OF THE INVENTION

Naval Tactical Data Systems (NTDS) devices were one of the first entries into the computer field and still find abundant applications in the military. As is known, the computer field continuously experiences innovations and constantly increases the speed and flexibility of each new generation of each new computerized equipment that enters into the field. One of the characteristics that is common to the new generation of equipment is a bus architecture, sometimes referred to as a bus topology, that improves the speed and increases the flexibility of interrelated equipment connected to the bus while at the same time allows for new equipment to be added in a piggy-back manner as known in the art. One of the new generations of computerized equipment employing a bus topology is computerized equipment having a Versa Module Eurocard Bus (VMEbus).

Systems that provide for the exchange of information between a NTDS device and computerized equipment employing a VMEbus are known in the art and some of which are described in U.S. Pat. Nos. 5,388,210 ('210) and 5,414,814 ('814) both of which are herein incorporated by reference. It is desired that means be provided that allows for NTDS devices to be adapted so as to be able to exchange information with new generations of computerized equipment, especially, the computerized equipment that employs a bus topology, more particularly, a Versa Module Eurocard Bus (VMEbus) while at the same time increase the throughput of the exchange of information, relative to the systems described in the '210 and '814 patents, between the NTDS device and the computerized equipment employing a VMEbus.

OBJECTS OF THE INVENTION

It is a primary object of the present invention to provide a quick development cycle and allow a trouble shooting ability between similar units.

It is an object of the present invention to provide for a fully menu driven program driver that allows for a device employing a VMEbus to exchange information with a NTDS device having an interface defined by Military Standard (Mil Std)—1397B type A, B, C, D, E, and F, with the word size being 16 or 32 bits utilized by a direct memory access (DMA) transfer and able to accommodate programmable modes of the NTDS device defined by categories I, II and III of the Mil Std 1397B.

Moreover, it is an object of the present invention to provide a program which also utilizes the full capabilities of a Motorola VMEbus bused processor to maximize data transfer rate by having that processor programmed/ optimized before data transfers are started. The driver for the Motorola processor is activated prior to utilizing the application software and is present but not seen by the user of the driver package.

SUMMARY OF THE INVENTION

The present invention is directed to a processor comprising a program driver that provides for the exchange of information between a NTDS device and a device employing a bus topology, more particularly, employing a VMEbus and increasing the throughput of the exchange of data therebetween.

The processor responds to operating routines and also to interrupts of an interrupt table therein. The processor manipulates data to and from its memory and provides for the exchange of data between at least two devices, each with internal accessible registers and each having a software protocol that is different from each other, with the first protocol being used to control a Naval Tactical Data System (NTDS) device and the second protocol being used to control at least a device having a VMEbus. The processor comprises a program driver comprising machine instructions and respective means responsive thereto. The machine instructions and the means thereof are responsive to the operating routines of the processor and are capable of accessing and manipulating the contents of the internal accessible registers of the two devices. The machine instructions are locatable in the memory of the processor. The machine instructions and means thereof comprises the following items: command/chain, count and address. The chain item specifies the next machine instruction that the operating routines of the processor goes to after the current instruction being acted on by the operating routines of the processor is executed. The count specifies the number of words comprising the data being exchanged between the two devices. The address specifies the address of the memory being accessed.

BRIEF DESCRIPTION OF THE DRAWINGS

FIG. 1 is a block diagram illustrating the interrelationship between a Naval Tactical Data System (NTDS) device and a processor having therein a program driver means that allows for such exchange of information between devices employing a bus topology.

FIG. 2 illustrates details of the program driver means of FIG. 1.

FIG. 3 illustrates a flow chart of the program driver means of FIG. 1.

DETAILED DESCRIPTION OF THE PREFERRED EMBODIMENTS

FIG. 1 is a block diagram illustrating a processor 10 of the present invention that operates in response to resident routines and also in response to interrupts of an interrupt table to manipulate data to and from its memory. The processor 10 provides for the exchange of information between at least two devices each with internal accessible registers and each having a software protocol that is different from each other. One of the devices involved in the exchange is a Naval Tactical Data System (NTDS) device 12, whereas the second may be at least one of the devices 14 and 16 respectively representative of a computer 14 and a peripheral 16 with each having a bus topology, especially a Versa Module Eurocard Bus (VMEbus).

The processor 10 has means, other than the program driver of the present invention, that allows for the NTDS device 12 to communicate with the devices 14 and 16. These communication means of the present invention are known in the art and may be those disclosed in the previously incorporated by reference U.S. Pat. Nos. 5,414,814 and 5,388,210. U.S. Pat. No. 5,414,814 ('814) discloses a computer interface that is provided to support communications between a VMEbus architecture and a NTDS computer having a protocol established by Mil-Std 1397B. As generally disclosed in col. 3, lines 25–49 therein, the '814 patent provides for the conversion, as required, between a serial format of the NTDS device to the parallel VMEbus format. U.S. Pat. No. 5,388,210 ('210) discloses a modular system for interfacing a Navy Standard UYK-43 computer to work station consoles. More particularly, the '210 patent in col. 3, line 37 through col. 4, line 25, discloses that the UYK-43 computer operates in response to MIL-STD 1397 Naval Tactical Data Systems, and in col. 3, lines 65–68 discloses that the system backplane is capable of handling parallel data transfer, such as the Versa Module Eurocard (VME) backplane. The processor 10 includes the disclosed means of the '814 and '210 patents to allow for communication between the NTDS device 17 and the devices 12 and 14 employing a bus topology.

The processor 10 of FIG. 10 is preferably a Motorola MVME 167 processor, known in the art, with eight (8) Mega capability of random access memory (RAM). The processor is preferably responsive to an OS-9 operating system, also known in the art, but may also be responsive to UNIX based systems. More particularly, the programming code "Kernel" can be modified to work on UNIX based systems utilizing the VMEbus.

The NTDS device 12 operates in accordance with a protocol defined in Military Standard (Mil Std)-1397B type A, B, C, D, E, and F. The NTDS device 12 has input and output ports 18 and 20 and provides an interface 22 that carries 16 or 32 bits of direct memory access data transfers under software control to and from the memory 22 via an interface 24. The Mil-Std 1397B, herein incorporated by reference, defines a mode that is selectable under software control to allow the exchange of information defined by Category I (Computer to Peripheral), Category II (Computer to Computer, or Intercomputer), or Category III (Peripheral to Peripheral) operation. The Mil-Std 1397B document defines four (4) software control functions which are: External Interrupt (EI); External Function (EF); output data (OD); and input data (ID), each having their own direct memory access (DMA) control and instruction execution logic. The mechanism providing each control with its own DMA logic allows for four buffers respectively related to the four control functions to be active at the same time, along with four independent I/O (including ports 18 and 20) chains to be simultaneously active. This mechanism with its own DMA logic is a contributor to the program driver means 28 of the present invention so as to allow for an exchange of information between the NTDS device 12 and either of the device 14 or 16, in a manner to be more fully described hereinafter.

The computer 14 and the peripheral 16, under normal conditions, that is, while not exchanging information with the NTDS device 12 communicate with each other by a bus topology 26. The type of bus that is of particular interest to the present invention is a Versa Module Eurocard Bus (VMEbus). More particularly, the practice of this invention was implemented using the protocol for the VMEbus, but the principles of the present invention that provide for a relatively rapid exchange of information to and from a NTDS device 12 contemplates computerized equipment having various bus topology. In addition to the computer 14 and peripheral 16 communicating to each other by way of the VMEbus 26, the processor 10, in particular the program driver means 28 of the present invention, also allows for the NTDS 12 device to communicate by way of the VMEbus 26.

The program driver means 28 comprises machine instructions and respective means responsive thereto in a manner known in the art. The machine instructions and the means therefor and the contents thereof are responsive to and manipulated by the operating routines of the processor 10 and are capable of activating and manipulating the contents of the internal accessible registers of the NTDS device 12, the computer 14, and the peripheral 16. The machine instructions of the program driver means 28 are located in the memory of the processor 10 and are comprised of the following items, sometimes referred to as data items: (1) Command/Chain, (2) Count, and (3) Address, all of which are to be further described hereinafter.

The processor 10 preferably operates in response to real-time operating system OS/9, known in the art. The program driver means 28 is responsive to machine instructions preferably written in the "C" programming language, also known in the art. The program driver means 28 is implemented, in one embodiment, by use of Visi Com-Antares Group 4,000 Series, Type A/B slow/fast, 6U form factor, VME based Integrated Circuit Card. The program driver means 28 card is made available by the Antares Group, Visi Com Laboratories, Inc., whose operation is defined by User Manual for the 4,000 Series Rev. D VMEbus NTDS INPUT/OUTPUT BOARD (VMENIO). The program driver means 28 provides the ability to do comprehensive data processing on incoming or outgoing data streams (i.e., pre and post data processing) "on the fly." Each of the data processing provided by the program driver means 28 adds only about 300 nanoseconds to each transferring and requires no additional memory references. The program driver means 28 is advantageous in that allows for the use of chain instructions and provides data buffers which can be programmed to receive or transmit data to and from selected registers within the processor 10, the computer 14 or the peripheral 16.

In general, the program driver means 28 is utilized to exchange information by way of the VMEbus 26 by use of EF command words in Category I defined by the Military Standard previously mentioned. The program driver means 28 is also programmed for Category II and Category III data transfers. The program driver means 28 may be further described with reference to FIG. 2.

FIG. 2 illustrates machine instructions comprised of items Command/Chain, Count, and Buffer Address previously mentioned. The chain item specifies the next machine instruction for the operating routines of the processor 10 to go to after the then current instruction is executed by the operating routines of the processor 10. The count item specifies the number of words being exchanged between any two devices, that is, between the NTDS device 12 and any of the devices 14 and 16 shown in FIG. 1. The address item specifies the address of the memory in the processor 10 being accessed by the operating routines of the processor 10. The mode command shown in FIG. 2 is representative of Categories I, II and III. The commands of FIG. 2 are associated with items for the computer 14 and peripheral 16 each operating with the VMEbus 26 and comprising active input buffer (AIC), active output buffer (AOC), initiate input buffer (IB), and initiate output buffer (OB) commands. The command items that are applicable to the NTDS device 12 comprise output data (OD), external function (EF), external interrupt (EI) and input data (ID).

The commands AIC and AOC of FIG. 2 are used to activate input and output buffers respectively. The processes activated by the commands AIC and AOC remain active until they are initiated by an IB (initiate input buffer) command, followed by an OB (initiate output buffer) command, at which point the processes are terminated. Data can be stored in buffers before being sent as output data (OD) for the NTDS device 12 or as output buffer (OB) as used for the program driver means 28 to communicate with either of the devices 14 and 16 having a VMEbus 26. Similarly, data can be stored in the buffer before being sent as external function (EF) control signals for the NTDS device or as control signal FB so that the program driver means 28 can communicate with either of the devices 14 and 16 having a VMEbus 26. An external interrupt (EI) buffer, used in the NTDS device 12, can be assigned to catch all incoming status words to the NTDS device 12 and similarly, a control signal XB can be used to catch all incoming status words from either of the devices 14 and 16. An input data (ID), as used for the NTDS device 12 can be assigned to a specific memory location in memory 24 and similarly, an input buffer (IB) can be assigned a specific memory location in memory 24. Further, an input data (ID) buffer, used for communicating with the NTDS device 12, can be assigned a specific location in memory of the processor 10 and, similarly, an initiate input buffer (IB) can be assigned a specific location in memory of the processor 10.

To provide for the exchange of data between the NTDS device 12 and either of the devices 14 and 16 having a VMEbus topology, three pieces of information or data item are necessary for each instruction, that is, a command/chain, a count, and a buffer address. As previously mentioned, the program driver means 28 implements a chain sequence which may be described with reference to FIG. 2 having typical command/chain, count and addresses. The chain starts at a physical address 0X0060000 in memory, that is, the memory 22 in the processor 10. The first command in the chain is the MODE command. The MODE command, MODE+CHAIN+CAT is necessary, and so is the address FFFFFF40, which allows access to the processor's interrupt table also stored in the memory 22 in the processor 10. The MODE command is always the first command in a command chain of the present invention. It should be noted that the COUNT data item is not used in some instances; for example, it is not used with the issuance of the MODE, AIC, or AOC commands.

Again with reference to FIG. 2, at address 0X00060008 an input chain is activated (AIC+CHAIN). It should be noted that an address in physical memory, namely 0X0060018, points to the information contained in the IB (initiate buffer transfer) instruction. More particularly, the AIC+CHAIN machine instructions tells the operating routines of the processor 10 where to go to (memory location 0X0060018) after it completes its execution of its then current machine instruction.

The chain command shown in FIG. 2, corresponding to the address 0X00060008, itself only tells the program driver means 28 to go to the next instruction after it has completed the current instruction. For the example shown in FIG. 2, once the IB (memory 0X00060018) finishes executing, the AOC command at 0X00060010 is activated, but without a chain command added to it. The AOC command points to address 0X00060020, which is a OB (initiate output buffer transfer) command. The processor 10, in response to its operating programs, then goes to the physical memory location of 0X00050000 and begins a transfer of 1,000 words to input buffer address 0X00051000. The program then ends. It should be noted that for a "C" coded program which is preferably used to implement the program driver means 28, 1,000 words was stored at memory location 0X0050000. These 1,000 words are transferred over the NTDS interface established by input and output ports 18 and 20 shown in FIG. 1 and are stored successfully starting at memory location 0X00051000. Once the operation is complete the stored data may be analyzed to determine if the operation is successful. The program driver means 28 may be further described with reference to FIG. 3 that illustrates a flow chart.

FIG. 3 illustrates a simplified flow chart of the program driver means 28 responsive to an OS-9 operating program. As seen in FIG. 3, the program 30 starts off by the initializing event 32 and passes control to program segment 34 that specifies the entry of a file name so to define where the related data is to be stored. After completion, program segment 34 passes control to program segment 36.

Program segment 36 determines whether the data is to be entered by way of an input terminal or by way of a file data entry, and if a file data entry is applicable, program segment 36 passes control program segment 38 that enters the file name so that the parameters used to read the gathered data are fetched from memory, and then program segment 38, passes the control to program segment 40.

Program segment 40 reads in the base address, starting chain address, and all data corresponding to the control functions OB and FB of the VMEbus 26. Program segment 40, then passes control to program segment 42 which runs the program, such as that disclosed with reference to FIG. 2.

With reference back to program segment 36, if the program segment 36 determines that the information is going to be entered by way of a terminal, program segment 36 passes control to program segment 44.

Program segment 44 requests that the input terminal enters the base address of the program driver means 28 and then passes control to program segment 46 which, in turn, requests that the input terminal enter the chain starting address (i.e., starting address in memory where the commands discussed with reference to FIG. 2 are stored) and then passes control to program segment 48.

Program segment 48 monitors the output of program segment 46 and if the entry information is going to be continued, passes control to program segment 50.

Program segment 50 requests that the input terminal enter the chain data items: Command, Count and Buffer Address and then passes control to program segment 52 which, in turn, requests that the input terminal enter the OB or FB commands of FIG. 2 and then passes control over to program segment 54 which, in turn, requests that the input terminal enter data sequentially by line and if the line information is not complete passes control to program segment 56.

Program segment 56 continues the request to the input terminal to the enter data with starting values and increment and then passes control over to program segment 58 which, in turn, starts the incremental entry routine and passes control back to program segment 48 which is a continuation segment previously described.

After program segment 54 completes the data sequentially entered line by line, it passes control over to program segment 60 which, in turn, passes control back to program segment 48.

Program segment 48 having control passed to it from program segments 46, 58 and 60, when complete, passes control to program segment 42 which runs the program of FIG. 2 and when program segment 42 is complete, control is passed to program event 62 indicating the end of the program of FIG. 3.

It should now be appreciated that the practice of the present invention provides for a program driver means that allows for the exchange of information between an NTDS device and any device using a bus topology and more specifically a device using a VMEBUS 28 as shown in FIG. 1.

What I claim is:

1. A processor with operating routines responsive to interrupts of an interrupt table therein for manipulating data to and from a memory in the processor, said processor providing for an exchange of data between at least two devices each with internal accessible registers and each having a software protocol that is different from each other with a first protocol being used to control a Naval Tactical Data System (NTDS) device and a second protocol being used to control at least one device having a bus topology, said processor comprising:

(a) a program driver comprising machine instructions and respective means responsive thereto, said machine instructions and means thereof being responsive to said operating routines of said processor and capable of activating said internal accessible registers of said two devices, said machine instructions being locatable in said memory of said processor, said machine instructions and means thereof comprising the following items:

(i) command/chain, wherein a chain item specifies a next machine instruction for the operating routines of the processor to go after a current instruction being acted on by the operating routines of the processor is executed;

(ii) count that specifies a number of words comprising said data being exchanged between said two devices; and (iii) address that specifies an address of said memory being accessed by the operating routines of the processor.

2. The processor according to claim 1, wherein said bus of said topology comprises a Versa Module Eurocard Bus (VMEbus).

3. A processor with operating routines responsive to interrupts of an interrupt table therein for manipulating data to and from a memory in the processor, said processor providing for an exchange of data between at least two devices each with internal accessible registers and each having a software protocol that is different from each other with a first protocol being used to control a Naval Tactical Data system (NTDS)device and a second protocol being used to control at least one device having a bus topology, said NTDS device having a protocol defining a mode that comprises categories I, II and III, said processor comprising:

(a) a program driver comprising machine instructions and respective means responsive thereto, said machine instructions and means thereof being responsive to said operating routines of said processor and capable of activating said internal accessible registers of said two devices, said machine instructions being locatable in said memory of said processor, said machine instructions and means thereof comprising the following items:

(i) command/chain, wherein said command item is selected so as to be representative of one of said categories I, II and III, and wherein a chain item specifies the next machine instruction for the operating routines of the processor to go after a current instruction being acted on by the operating routines of the processor is executed;

(ii) count that specifies a number of words comprising said data being exchanged between said two devices; and (iii) address that specifies an address of said memory being accessed by the operating routines of the processor.

4. The processor according to claim 2, wherein said command item is selected from the group comprising: activate input buffer (AIC); activate output buffer (AOC); initiate input buffer (IB); and initiate output buffer (OB).

5. The processor according to claim 3, wherein said command item is selected from the group comprising: output data (OD); external function (EF); external interrupt (EI); and input data (ID).

6. The processor according to claim 3, wherein said bus of said topology comprises a Versa Module Eurocard Bus (VMEbus).

7. The processor according to claim 3, wherein said command item is selected from the group comprising: activate input buffer (AIC); activate output buffer (AOC); initiate input buffer (IB); and initiate output buffer (OB).

8. A program driver responsive to a processor with operating routines, said program driver providing for an exchange of data between two devices each with internal accessible registers and each having a software protocol that is different from each other with a first protocol being used to control a Naval Tactical Data System (NTDS) device and a second protocol being used to control a device having a bus topology, said program driver comprising machine instructions and respective means responsive thereto, said machine instructions and means thereof being responsive to said operating routines of said processor and capable of activating said internal accessible registers of said two devices, said machine instructions being locatable in a memory of said processor, said machine instructions and means thereof comprising the following items:

(i) command/chain, wherein a chain item specifies a next machine instruction for the operating routines of the processor to go after a current instruction being acted on by the operating routines of the processor is executed;

(ii) count that specifies a number of words comprising said data being exchanged between said two devices; and (iii) address that specifies an address of said memory being accessed.

9. The program driver according to claim 8, wherein said bus of said topology comprises a Versa Module Eurocard Bus (VMEbus).

10. The program driver according to claim 9, wherein said command item is selected from the group comprising: activate input buffer (AIC); activate output buffer (AOC); initiate input buffer (IB); and initiate output buffer (OB).

11. A program driver responsive to a processor with operating routines, said program driver providing for an exchange of data between two devices each with internal accessible registers and each having a software protocol that is different from each other with a first protocol being used to control a Naval Tactical Data System (NTDS) device and a second protocol being used to control a device having a bus topology, said NTDS device having a protocol defining a mode that comprises categories I, II and III, said program driver comprising machine instructions and respective means responsive thereto, said machine instructions and means thereof being responsive to said operating routines of said processor and capable of activating said internal accessible registers of said two devices, said machine instructions being locatable in said memory of said processor, said machine instructions and means thereof comprising the following items:

(i) command/chain, wherein said command item is selected so as to be representative of one of said categories I, II and III, and wherein said chain item specifies a next machine instruction for the operating routines of the processor to go after a current instruction being acted on by the operating routines of the processor is executed;

(ii) count that specifies a number of words comprising said data being exchanged between said two devices; and (iii) address that specifies an address of said memory being accessed.

12. The program driver according to claim 11, wherein said command item is selected from the group comprising: output data (OD); external function (EF); external interrupt (EI); and input data (ID).

13. The program driver according to claim 11, wherein said bus of said topology comprises a Versa Module Eurocard Bus (VMEbus).

14. The program driver according to claim 11, wherein said command item is selected from the group comprising: output data (OD); external function (EF); external interrupt (EI); and input data (ID).

* * * * *